United States Patent
Du et al.

(10) Patent No.: US 9,763,269 B2
(45) Date of Patent: Sep. 12, 2017

(54) SIGNALLING PROCEDURES FOR DATA TRANSMISSIONS

(71) Applicant: Nokia Solutions and Networks Oy, Espoo (FI)

(72) Inventors: Lei Du, Beijing (CN); Yan Ji Zhang, Beijing (CN); Woonhee Hwang, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 34 days.

(21) Appl. No.: 14/774,853

(22) PCT Filed: Mar. 12, 2013

(86) PCT No.: PCT/CN2013/072452
§ 371 (c)(1),
(2) Date: Sep. 11, 2015

(87) PCT Pub. No.: WO2014/139084
PCT Pub. Date: Sep. 18, 2014

(65) Prior Publication Data
US 2016/0044713 A1 Feb. 11, 2016

(51) Int. Cl.
*H04W 74/08* (2009.01)
*H04W 72/04* (2009.01)
*H04W 74/00* (2009.01)

(52) U.S. Cl.
CPC ..... *H04W 74/0833* (2013.01); *H04W 72/048* (2013.01); *H04W 74/002* (2013.01)

(58) Field of Classification Search
CPC ... H04W 72/02; H04W 76/02–76/028; H04W 76/048; H04W 72/048; H04W 74/002–74/008; H04W 74/0833
See application file for complete search history.

(56) References Cited

U.S. PATENT DOCUMENTS

2012/0163313 A1* 6/2012 Jung ............... H04W 72/048
370/329
2013/0017779 A1* 1/2013 Song ............... H04W 76/005
455/39

(Continued)

FOREIGN PATENT DOCUMENTS

| CN | 101453777 A | 6/2009 |
|---|---|---|
| WO | WO 2008/073024 A1 | 6/2008 |
| WO | WO 2009/146864 A1 | 12/2009 |

OTHER PUBLICATIONS

3GPP TS 22.368 V11.4.0 (Mar. 2012), "$3^{rd}$ Generation Partnership Project; Technical Specification Group Services and System Aspects; Service requirements for Machine-Type Communications (MTC); Stage 1 (Release 11)", 25 pgs.

(Continued)

*Primary Examiner* — Marcus R Smith
(74) *Attorney, Agent, or Firm* — Harrington & Smith

(57) ABSTRACT

A technique including deciding at a communication device between different types of signalling procedure for a data transmission to a network, based on one or more rules outside the control of the communication device; wherein said different types of signalling procedure have different signalling overhead profiles.

19 Claims, 7 Drawing Sheets

(56) References Cited

U.S. PATENT DOCUMENTS

2013/0044708 A1\* 2/2013 Kim ................ H04W 4/06
370/329
2014/0016614 A1\* 1/2014 Velev ............... H04W 4/005
370/331

OTHER PUBLICATIONS

RP-101026, "RAN mechanisms to avoid CN overload due to Machine-Type Communications" 3GPP™ Work Item Description, 5 pgs.
3GPP TSG-RAN #53, Fukuoka, Japan, Sep. 13-16, 2011, RP-111373, "New WI proposal: RAN overload control for Machine-Type Communications", Huawei, 5 pgs.
3GPP TSG SA WG2 Meeting #90, Apr. 16-20, 2012, Bratislava, Slovakia, TD S2-121866, "WID for Machine Type and Smartphone Communications Enhancements", Intel et al., 6 pgs.
3GPP TSG SA WG2 Meeting #90, Apr. 16-20, 2012, Bratislava, Slovakia, TD S2-121790, "WID for Small Data and Device Triggering Enhancements", Intel et al., 6 pgs.
3GPP TSG-RAN Meeting #57, Chicago, USA, Sep. 4-7, 2012, RP-121386, "New Work Item Proposal: RAN aspects of Machine-Type and other mobile data applications Communications enhancements (RAN Core part)", ZTE, 5 pgs.
3GPP TSG-RAN Meeting #57, Chicago, USA, Sep. 4-7, 2012, RP-121386, "New Work Item Proposal: RAN aspects of Machine-Type and other mobile data applications Communications enhancements (RAN Feature part)", ZTE, 4 pgs.
3GPP TSG RAN Meeting #57, Chicago, USA, Sep. 4-7, 2012, RP-121291, "Work Item LTE RAN Further Enhancements for Diverse Data Applications", Research in Motion UK Ltd., 6 pgs.

\* cited by examiner

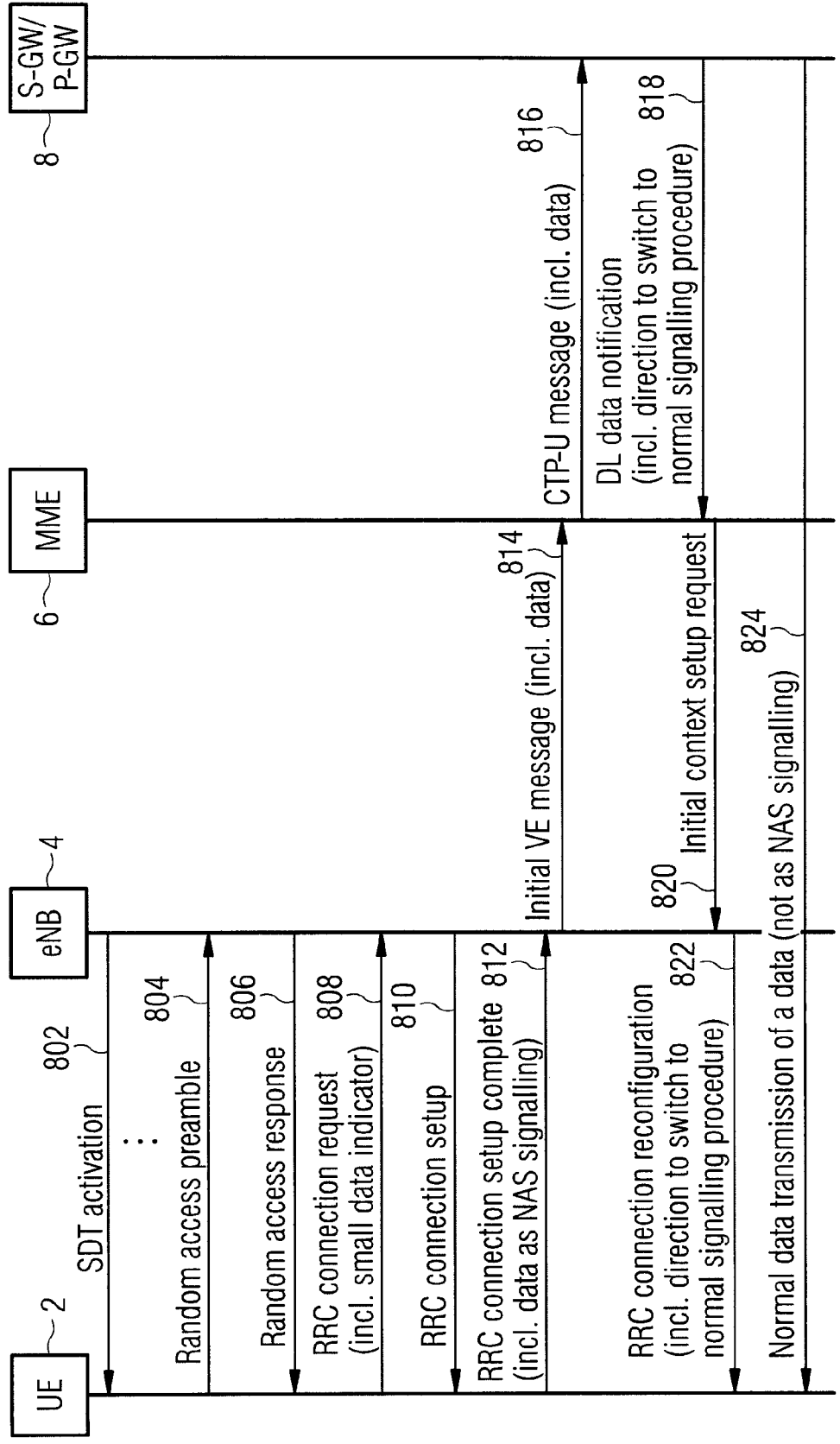

SIGNALLING PROCEDURES FOR DATA TRANSMISSIONS

An increasing number of radio connection sessions are established for the purpose of transmitting relatively small amounts of data from a communication device to a radio access network. This has led to a proposal to support different types of signalling procedure for data transmissions, which different types of signalling procedures have different signalling overhead profiles.

There has been identified the challenge of optimising the performance of a network that operates such different types of signalling procedures for data transmissions.

There is hereby provided a method, comprising: deciding at a communication device between different types of signalling procedure for a data transmission to a network, based on one or more rules outside the control of the communication device; wherein said different types of signalling procedure have different signalling overhead profiles.

According to one embodiment, said different types of signalling procedure for a data transmission comprise at least a first type of signalling procedure and a second type of signalling procedure, wherein the relative signalling efficiency of the first type of signalling procedure compared to the second type of signalling procedure decreases with the amount of data transmitted in a connection session; and said one or more rules include one or more of the following: (a) a rule that the time interval between any consecutive radio connection sessions for data transmission according to said first type of signalling procedure must be more than a threshold value; (b) a rule that the amount of data transmitted in a single connection session according to said first type of signalling procedure must be less than a threshold value; and (c) a rule prohibiting the use of said first type of signalling procedure for data transmissions associated with any application outside a limited selection of applications; (d) a rule prohibiting the use of said first type of signalling procedure for data transmissions to any application server outside of a limited selection of application servers; and (e) a rule excluding the use of said first type of signalling procedure for retransmissions; and (f) a rule excluding the use of said first type of signalling procedure for data transmissions unless the communication device detects an indication from the network that a cell serving the communication device currently supports and activates the first type of signalling procedure for data transmissions.

According to one embodiment, said one or more rules are defined as standard rules and are pre-stored at the communication device.

According to one embodiment, the method further comprises receiving information about said one or more rules in transmissions by the network.

According to one embodiment, the method further comprises: detecting at said communication device an indication that a cell serving said communication device is currently not supporting data transmissions according to a first type of signalling procedure, as an alternative to data transmissions according to a second type of signalling procedure, wherein the relative signalling efficiency of the first signalling procedure compared to the second signalling procedure decreases with the amount of data transmitted in a connection session: refraining from making any request for a radio connection session for a data transmission according to said first type of signalling procedure.

According to one embodiment, said indication comprises (a) the absence of a positive indication from the network that the cell serving said communication device is currently supporting data transmissions according to said first type of signalling procedure, or (b) a deactivation indicator in a message from the network.

There is also hereby provided a method, comprising: transmitting from a network to a communication device information about one or more rules to be followed by said communication device when deciding between different types of signalling procedure for a data transmission to the network, wherein said different types of signalling procedure have different signalling overhead profiles.

According to one embodiment, the method further comprises: communicating from said network to said communication device information about whether or not a cell serving said communication device is currently supporting data transmissions according to a first signalling procedure, as an alternative to data transmissions according to a second type of signalling procedure, wherein the relative signalling efficiency of the first signalling procedure compared to the second signalling procedure decreases with the amount of data transmitted in a connection session.

According to one embodiment, said communicating information about whether or not a cell serving said communication device is currently supporting and activating data transmissions according to a first signalling procedure comprises sending an activation indicator or a deactivation indicator.

There is also hereby provided a method comprising: in a network operating first and second types of signalling procedure for data transmissions, wherein the relative signalling efficiency of the first signalling procedure compared to the second signalling procedure decreases with the amount of data transmitted in a connection session: receiving at a network a request from a communication device for a radio connection session for data transmission according to said first type of signalling procedure; and deciding at said network whether to direct a change to said second type of radio signalling procedure.

According to one embodiment, said deciding is based on at least one of the following: (a) one more indicators of the performance of control and/or access channels; (b) the amount of data to be transmitted from the network to the communication device; and (c) a history of past requests by the communication device for connection sessions for data transmission according to said first signalling procedure.

According to one embodiment, the method further comprises: deciding at said network to direct a change to said second type of signalling procedure; and communicating from the network to the communication device a rejection of said request for a radio connection session together with a direction to request a new radio connection session for a data transmission according to said second type of signalling procedure.

According to one embodiment, communicating said rejection of said request comprises sending a RRC connection reject message, a RRC connection release message or a signalling connection release message.

According to one embodiment, communicating a rejection of said request is done together with communicating information about a length of time for which the communication device is prohibited from making a new request for a connection session for a data transmission according to said first type of signalling procedure.

According to one embodiment, the method further comprises: deciding to direct a change to said second type of signalling procedure; and sending to said communication device a connection set up message including a direction to proceed with said radio connection session according to said second type of signalling procedure.

According to one embodiment, the method further comprises: deciding to direct a change to said second type of signalling procedure during an existing radio connection session after a data transmission according to said first signalling procedure; and sending one or more messages towards said communication device including a direction to continue with said existing radio connection session according to said second type of signalling procedure.

According to one embodiment, said message includes one or more of the following messages: one or more messages from a core network entity towards a radio access network entity; and a message from said radio access network entity to said communication device.

According to one embodiment, said one or more messages from a core network entity towards a radio access network entity include a message from a gateway entity to a mobile management entity and/or a message from said mobile management entity to said radio access network entity.

According to one embodiment, the method further comprises: communicating from said network to said communication device an indication that a cell serving said communication device is currently supporting data transmissions according to said first signalling procedure, as an alternative to data transmissions according to a second type of signalling procedure.

According to one embodiment, said indication comprises an activation indicator.

There is also hereby provided a method comprising: communicating from a network to a communication device information about whether or not a cell serving said communication device is currently supporting data transmissions according to a first signalling procedure, as an alternative to data transmissions according to a second type of signalling procedure, wherein the relative signalling efficiency of the first signalling procedure compared to the second signalling procedure decreases with the amount of data transmitted in a connection session.

According to one embodiment, communicating from a network to a communication device said information about whether or not a cell serving said communication device is currently supporting data transmissions according to a first signalling procedure, comprises sending an activation indicator or a deactivation indicator.

There is also hereby provided a method comprising: in the event of detecting at a communication device an indication that a cell serving said communication device is currently not supporting data transmissions according to a first type of signalling procedure, as an alternative to data transmissions according to a second type of signalling procedure, wherein the relative signalling efficiency of the first signalling procedure compared to the second signalling procedure decreases with the amount of data transmitted in a connection session: refraining from making any request for a radio connection session for a data transmission according to said first type of signalling procedure.

According to one embodiment, said indication comprises (a) the absence of a positive indication that the cell serving said communication device is currently supporting data transmissions according to said first type of signalling procedure, or (b) a deactivation indicator from the network.

There is also hereby provided an apparatus comprising: a processor and memory including computer program code, wherein the memory and computer program code are configured to, with the processor, cause the apparatus to: decide at a communication device between different types of signalling procedure for a data transmission to a network, based on one or more rules outside the control of the communication device; wherein said different types of signalling procedure have different signalling overhead profiles.

According to one embodiment, said different types of signalling procedure for a data transmission comprise at least a first type of signalling procedure and a second type of signalling procedure, wherein the relative signalling efficiency of the first type of signalling procedure compared to the second type of signalling procedure decreases with the amount of data transmitted in a connection session; and said one or more rules include one or more of the following: (a) a rule that the time interval between any consecutive radio connection sessions for data transmission according to said first type of signalling procedure must be more than a threshold value; (b) a rule that the amount of data transmitted in a single connection session according to said first type of signalling procedure must be less than a threshold value; and (c) a rule prohibiting the use of said first type of signalling procedure for data transmissions associated with any application outside a limited selection of applications; (d) a rule prohibiting the use of said first type of signalling procedure for data transmissions to any application server outside of a limited selection of application servers; and (e) a rule excluding the use of said first type of signalling procedure for retransmissions; and (f) a rule excluding the use of said first type of signalling procedure for data transmissions unless the communication device detects an indication from the network that a cell serving the communication device currently supports and activates the first type of signalling procedure for data transmissions.

According to one embodiment, said one or more rules are defined as standard rules and are pre-stored at the communication device.

According to one embodiment, the memory and computer program code are further configured to, with the processor, cause the apparatus to: receive information about said one or more rules in transmissions by the network.

According to one embodiment, the memory and computer program code are further configured to, with the processor, cause the apparatus to: in response to detecting at said communication device an indication that a cell serving said communication device is currently not supporting data transmissions according to a first type of signalling procedure, as an alternative to data transmissions according to a second type of signalling procedure, wherein the relative signalling efficiency of the first signalling procedure compared to the second signalling procedure decreases with the amount of data transmitted in a connection session: refrain from making any request for a radio connection session for a data transmission according to said first type of signalling procedure.

According to one embodiment, said indication comprises (a) the absence of a positive indication from the network that the cell serving said communication device is currently supporting data transmissions according to said first type of signalling procedure, or (b) a deactivation indicator in a message from the network.

There is also hereby provided an apparatus comprising: a processor and memory including computer program code, wherein the memory and computer program code are configured to, with the processor, cause the apparatus to: transmit from a network to a communication device information about one or more rules to be followed by said communication device when deciding between different types of signalling procedure for a data transmission to the network, wherein said different types of signalling procedure have different signalling overhead profiles.

According to one embodiment, the memory and computer program code are further configured to, with the processor, cause the apparatus to: communicate from said network to said communication device information about whether or not a cell serving said communication device is currently supporting data transmissions according to a first signalling procedure, as an alternative to data transmissions according to a second type of signalling procedure, wherein the relative signalling efficiency of the first signalling procedure compared to the second signalling procedure decreases with the amount of data transmitted in a connection session.

According to one embodiment, said communicating information about whether or not a cell serving said communication device is currently supporting and activating data transmissions according to a first signalling procedure comprises sending an activation indicator or a deactivation indicator.

There is also hereby provided an apparatus comprising: a processor and memory including computer program code, wherein the memory and computer program code are configured to, with the processor, cause the apparatus to: in a network operating first and second types of signalling procedure for data transmissions, wherein the relative signalling efficiency of the first signalling procedure compared to the second signalling procedure decreases with the amount of data transmitted in a connection session: receive at a network a request from a communication device for a radio connection session for data transmission according to said first type of signalling procedure; and decide at said network whether to direct a change to said second type of radio signalling procedure.

According to one embodiment, said deciding is based on at least one of the following: (a) one more indicators of the performance of control and/or access channels; (b) the amount of data to be transmitted from the network to the communication device; and (c) a history of past requests by the communication device for connection sessions for data transmission according to said first signalling procedure.

According to one embodiment, the memory and computer program code are further configured to, with the processor, cause the apparatus to: in response to deciding at said network to direct a change to said second type of signalling procedure: communicate from the network to the communication device a rejection of said request for a radio connection session together with a direction to request a new radio connection session for a data transmission according to said second type of signalling procedure.

According to one embodiment, communicating said rejection of said request comprises sending a RRC connection reject message, a RRC connection release message or a signalling connection release message.

According to one embodiment, communicating a rejection of said request is done together with communicating information about a length of time for which the communication device is prohibited from making a new request for a connection session for a data transmission according to said first type of signalling procedure.

According to one embodiment, the memory and computer program code are further configured to, with the processor, cause the apparatus to: in response to deciding to direct a change to said second type of signalling procedure: send to said communication device a connection set up message including a direction to proceed with said radio connection session according to said second type of signalling procedure.

According to one embodiment, the memory and computer program code are further configured to, with the processor, cause the apparatus to: in response to deciding to direct a change to said second type of signalling procedure during an existing radio connection session after a data transmission according to said first signalling procedure: send one or more messages towards said communication device including a direction to continue with said existing radio connection session according to said second type of signalling procedure.

According to one embodiment, said message includes one or more of the following messages: one or more messages from a core network entity towards a radio access network entity; and a message from said radio access network entity to said communication device.

According to one embodiment, said one or more messages from a core network entity towards a radio access network entity include a message from a gateway entity to a mobile management entity and/or a message from said mobile management entity to said radio access network entity.

According to one embodiment, the memory and computer program code are further configured to, with the processor, cause the apparatus to: communicate from said network to said communication device an indication that a cell serving said communication device is currently supporting data transmissions according to said first signalling procedure, as an alternative to data transmissions according to a second type of signalling procedure.

According to one embodiment, said indication comprises an activation indicator.

There is also hereby provided an apparatus comprising a processor and memory including computer program code, wherein the memory and computer program code are configured to, with the processor, cause the apparatus to: communicate from a network to a communication device information about whether or not a cell serving said communication device is currently supporting data transmissions according to a first signalling procedure, as an alternative to data transmissions according to a second type of signalling procedure, wherein the relative signalling efficiency of the first signalling procedure compared to the second signalling procedure decreases with the amount of data transmitted in a connection session.

According to one embodiment, communicating from a network to a communication device said information about whether or not a cell serving said communication device is currently supporting data transmissions according to a first signalling procedure, comprises sending an activation indicator or a deactivation indicator.

There is also hereby provided an apparatus comprising a processor and memory including computer program code, wherein the memory and computer program code are configured to, with the processor, cause the apparatus to: in the event of detecting at a communication device an indication that a cell serving said communication device is currently not supporting data transmissions according to a first type of signalling procedure, as an alternative to data transmissions according to a second type of signalling procedure, wherein the relative signalling efficiency of the first signalling procedure compared to the second signalling procedure decreases with the amount of data transmitted in a connection session: refraining from making any request for a radio connection session for a data transmission according to said first type of signalling procedure.

According to one embodiment, wherein said indication comprises (a) the absence of a positive indication that the cell serving said communication device is currently supporting data transmissions according to said first type of signalling procedure, or (b) a deactivation indicator from the network.

There is also hereby provided an apparatus comprising: means for deciding at a communication device between different types of signalling procedure for a data transmission to a network, based on one or more rules outside the control of the communication device; wherein said different types of signalling procedure have different signalling overhead profiles.

There is also hereby provided an apparatus comprising: means for transmitting from a network to a communication device information about one or more rules to be followed by said communication device when deciding between different types of signalling procedure for a data transmission to the network, wherein said different types of signalling procedure have different signalling overhead profiles.

There is also hereby provided an apparatus comprising: in a network operating first and second types of signalling procedure for data transmissions, wherein the relative signalling efficiency of the first signalling procedure compared to the second signalling procedure decreases with the amount of data transmitted in a connection session: means for receiving at the network a request from a communication device for a radio connection session for data transmission according to said first type of signalling procedure; and means for deciding at said network whether to direct a change to said second type of radio signalling procedure.

There is also hereby provided an apparatus comprising: means for communicating from a network to a communication device information about whether or not a cell serving said communication device is currently supporting data transmissions according to a first signalling procedure, as an alternative to data transmissions according to a second type of signalling procedure, wherein the relative signalling efficiency of the first signalling procedure compared to the second signalling procedure decreases with the amount of data transmitted in a connection session.

There is also hereby provided an apparatus comprising: in the event of detecting at a communication device an indication that a cell serving said communication device is currently not supporting data transmissions according to a first type of signalling procedure, as an alternative to data transmissions according to a second type of signalling procedure, wherein the relative signalling efficiency of the first signalling procedure compared to the second signalling procedure decreases with the amount of data transmitted in a connection session, means for refraining from making any request for a radio connection session for a data transmission according to said first type of signalling procedure.

There is also hereby provided a computer program product comprising program code means which when loaded into a computer controls the computer to: decide at a communication device between different types of signalling procedure for a data transmission to a network, based on one or more rules outside the control of the communication device; wherein said different types of signalling procedure have different signalling overhead profiles.

There is also hereby provided a computer program product comprising program code means which when loaded into a computer controls the computer to: transmit from a network to a communication device information about one or more rules to be followed by said communication device when deciding between different types of signalling procedure for a data transmission to the network, wherein said different types of signalling procedure have different signalling overhead profiles.

There is also hereby provided a computer program product comprising program code means which when loaded into a computer controls the computer to: in a network operating first and second types of signalling procedure for data transmissions, wherein the relative signalling efficiency of the first signalling procedure compared to the second signalling procedure decreases with the amount of data transmitted in a connection session: receive at the network a request from a communication device for a radio connection session for data transmission according to said first type of signalling procedure; and decide at said network whether to direct a change to said second type of radio signalling procedure.

There is also hereby provided a computer program product comprising program code means which when loaded into a computer controls the computer to: communicate from a network to a communication device information about whether or not a cell serving said communication device is currently supporting data transmissions according to a first signalling procedure, as an alternative to data transmissions according to a second type of signalling procedure, wherein the relative signalling efficiency of the first signalling procedure compared to the second signalling procedure decreases with the amount of data transmitted in a connection session.

There is also hereby provided a computer program product comprising program code means which when loaded into a computer controls the computer to: in the event of detecting at a communication device an indication that a cell serving said communication device is currently not supporting data transmissions according to a first type of signalling procedure, as an alternative to data transmissions according to a second type of signalling procedure, wherein the relative signalling efficiency of the first signalling procedure compared to the second signalling procedure decreases with the amount of data transmitted in a connection session: refrain from making any request for a radio connection session for a data transmission according to said first type of signalling procedure.

Embodiments of the present invention are described in detail hereunder, by way of example only, with reference to the accompanying drawings, in which:

FIGS. 6 to 8 illustrate three examples of techniques according to a second embodiment of the present invention, and each also incorporating a technique according to a third embodiment.

Techniques according to embodiments of the invention are described in detail below, by way of example only, in the context of an Evolved Packet System including an Evolved UMTS radio access network (EUTRAN) and an Evolved Packet Core (EPC). UMTS=Universal Mobile Telecommunications System.

Figure 1:
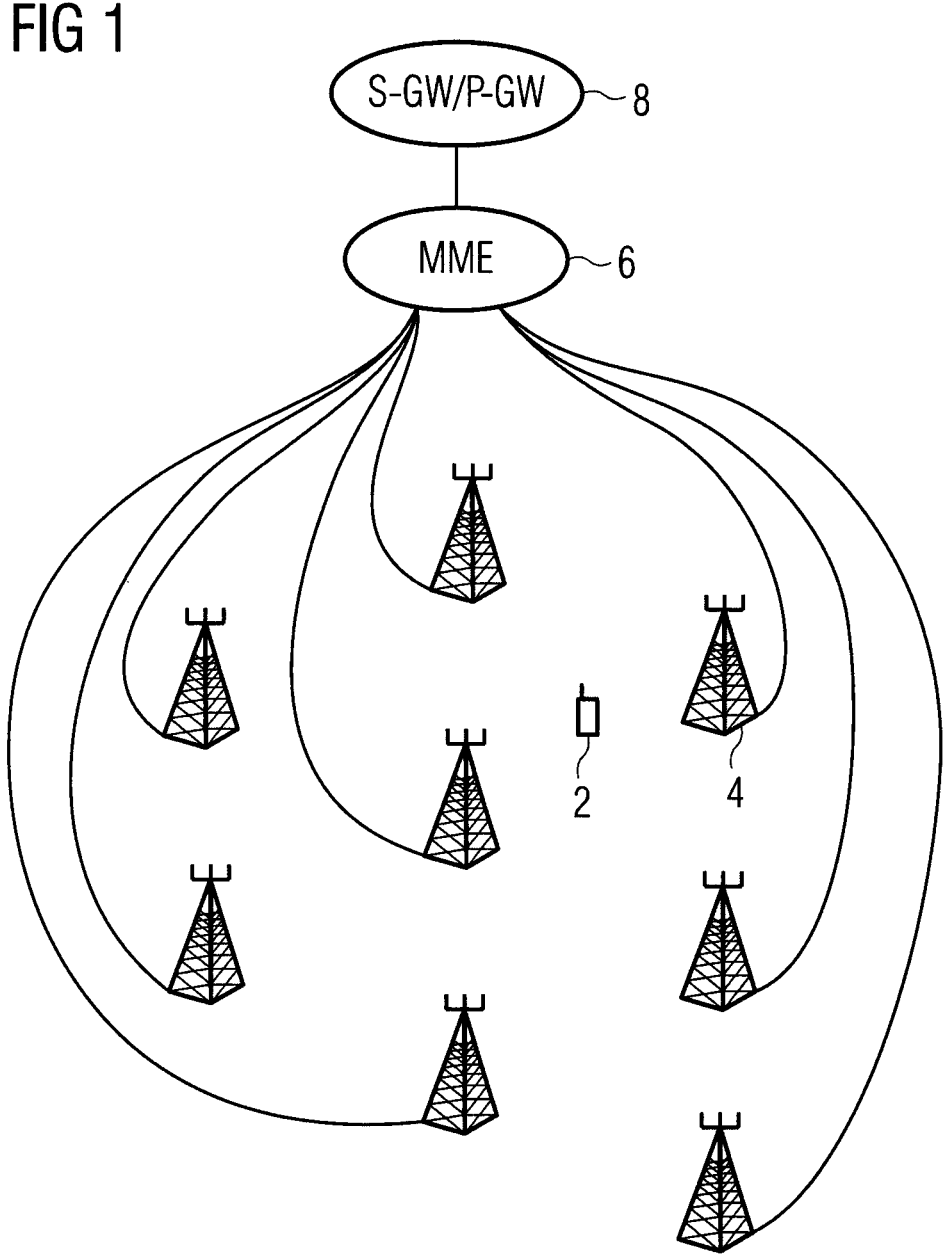
FIG. 1 illustrates some entities of an evolved packet system (EPS) as an example of a network in which embodiments of the present invention can be implemented.

The EUTRAN comprises a network of base stations (eNodeBs (eNBs)) 4. Only a small number of eNBs 4 are shown in FIG. 1, but a radio access network would typically comprise thousands of eNBs 4. Each eNB 4 operates one or more cells. The coverage area of each cell depends on the transmission power and the directionality of the antenna by which the cell is operated. Together, the eNBs 4 provide radio coverage over a wide geographical area.

The core network (EPC) includes a plurality of logical nodes of which the main nodes are a mobility management entity (MME) 6, a serving gateway (S-GW) and a PDN gateway (P-GW) (shown collectively in FIG. 1 as entity 8). The MME 6 processes signalling between user equipment (UE) 2 and the EPC, known as non-access stratum (NAS) signalling.

UE 2 may, for example, be a device that does not need human interaction, such as an entity that is involved in Machine Type Communications (MTC).

UE 2 may also be a device designed for tasks involving human interaction such as making and receiving phone calls between users, and streaming multimedia or providing other digital content to a user. Non-limiting examples include a smart phone, and a laptop computer/notebook computer/tablet computer/e-reader device provided with a wireless interface facility.

Figure 2:
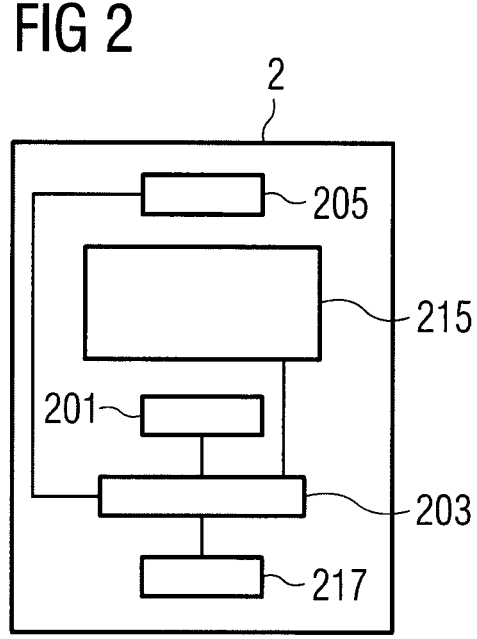
FIG. 2 illustrates an example of apparatus for use at user equipment (UE) in FIG. 1.

FIG. 2 shows a schematic view of an example of user equipment (UE) 2 that may be used for communicating with the eNBs 4 of FIG. 1 via a wireless interface. The UE 2 may be any device capable of at least sending or receiving radio signals to or from the eNBs 4 of FIG. 1.

The UE 2 may communicate via an appropriate radio interface arrangement 205 of the UE 2. The interface arrangement may be provided for example by means of a radio part and associated antenna arrangement. The antenna arrangement may be arranged internally or externally to the UE 2.

The UE 2 may be provided with at least one data processing entity 203 and at least one memory or data storage entity 217 for use in tasks it is designed to perform. The data processor 213 and memory 217 may be provided on an appropriate circuit board and/or in chipsets.

In the cases of devices designed for human interaction, the user may control the operation of the UE 2 by means of a suitable user interface such as key pad 201, voice commands, touch sensitive screen or pad, combinations thereof or the like. A display 215, a speaker and a microphone may also be provided. Furthermore, the UE 2 may comprise appropriate connectors (either wired or wireless) to other devices and/or for connecting external accessories, for example hands-free equipment, thereto.

Figure 3:
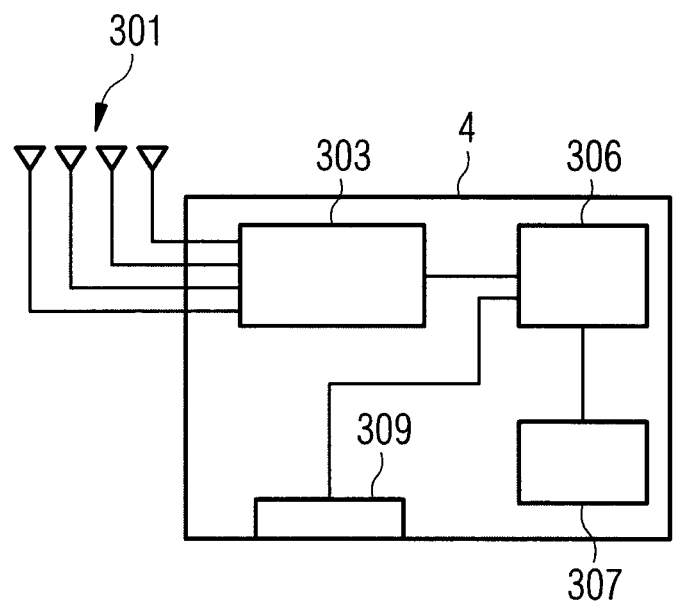
FIG. 3 illustrates an example of apparatus for use at the base stations in FIG. 1.

FIG. 3 shows an example of apparatus for use at the eNBs 4 of FIG. 1. The apparatus comprises a radio frequency antenna array 301 configured to receive and transmit radio frequency signals; radio frequency interface circuitry 303 configured to interface the radio frequency signals received and transmitted by the antenna 301 and the data processor 306. The radio frequency interface circuitry 303 may also be known as a transceiver. The apparatus also comprises an interface 309 via which, for example, it can communicate with other network elements such as the MME 6. The data processor 306 is configured to process signals from the radio frequency interface circuitry 303, control the radio frequency interface circuitry 303 to generate suitable RF signals to communicate information to the UE 2 via the wireless communications link, and also to exchange information with other network nodes via the interface 309. The memory 307 is used for storing data, parameters and instructions for use by the data processor 306.

It would be appreciated that the apparatus shown in each of FIGS. 2 and 3 described above may comprise further elements which are not directly involved with the embodiments of the invention described hereafter.

Each of the embodiments described below, involves at least two different types of signalling procedures for data transmissions, a normal signalling procedure and an alternative signalling procedure, which differ at least in regard to their signalling overhead profiles.

Figure 4A:
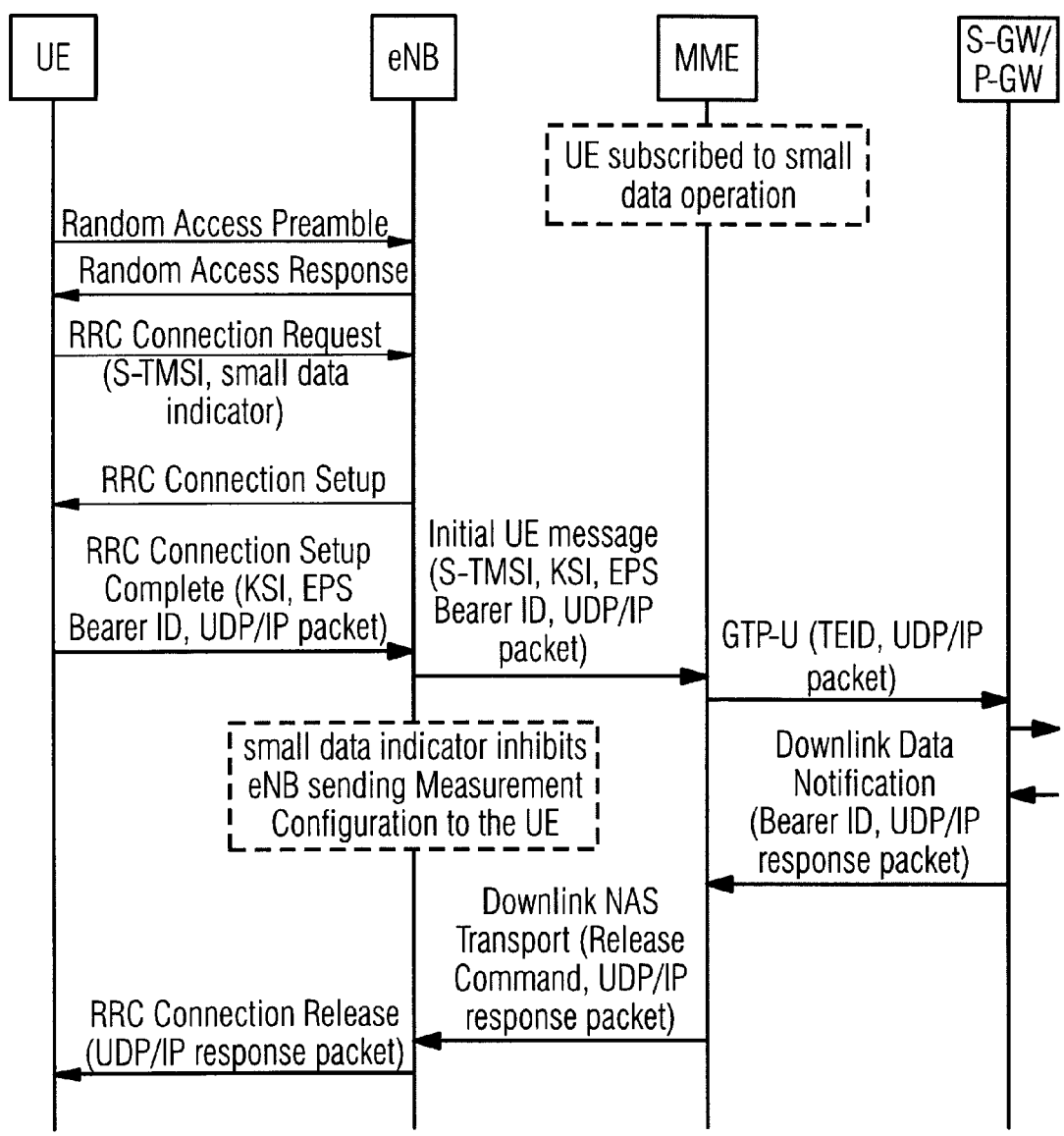
FIG. 4a illustrates an example of an alternative signalling procedure for a data transmission.

One example of an alternative signalling procedure for data transmission is illustrated in FIG. 4a. Features of the alternative signalling procedure that distinguish over the normal signalling procedure include: (i) the UDP/IP packets to be transmitted are included in the RRC Connection Setup Complete message; (ii) a pre-established NAS security context is used to transfer the UDP/IP packet(s) as NAS signalling without establishing RRC security; and (iii) the deliberate omission of any configuration of the UE for performing measurements for the radio connection session. The acronyms used in FIG. 4a are explained below. RRC=Radio Resource Control; S-TMSI=SAE Temporary Mobile Subscriber Identity; SAE=System Architecture Evolution; KSI=Key Set Identifier; UDP=User Datagram Protocol; IP=Internet Protocol; TEID=Tunnel Endpoint Identifier; NAS=Non Access Stratum.

Figure 4B:
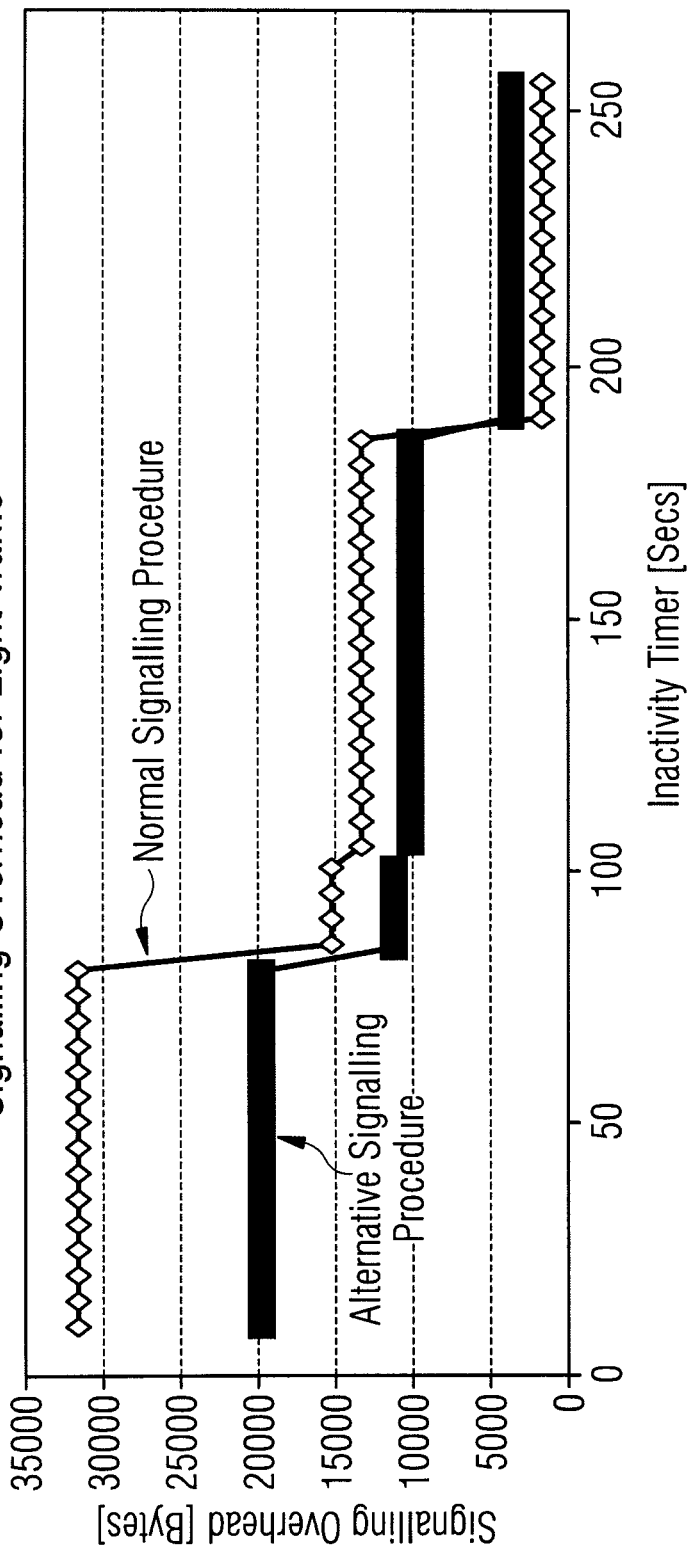
FIG. 4b illustrates an example of the difference in the signalling overhead profiles between the different signalling procedures used in an embodiment of the present invention.

The two signalling procedures (i.e. the alternative signalling procedure and the normal signalling procedure) have intersecting signalling overhead profiles. The signalling overhead for the first data packet to be transmitted in a connection session is less with the alternative signalling procedure than with the normal signalling procedure because of the condensed signalling procedure to set up RRC connection, but the decrease in signalling overhead for subsequent data packets in the same connection session is less with the alternative signalling procedure than with the normal signalling procedure, and for some later data packets in the same connection session, the alternative type of signalling procedure involves a greater signalling overhead than the normal signalling procedure. This difference in signalling overhead profile is illustrated in FIG. 4b, in which an increasing inactivity time (x-axis) is an indication of an increasing time period of the connection session and also implying an increasing number of data packets transmitted in the connection session.

The excessive use of the alternative type of signalling procedure for data transmissions can have a negative impact on the performance of the control channels via which the signalling is transmitted, and/or on the contention-based random access channel via which radio connection sessions for data transmissions (according to both types of signalling procedure) are initiated.

Figure 5:
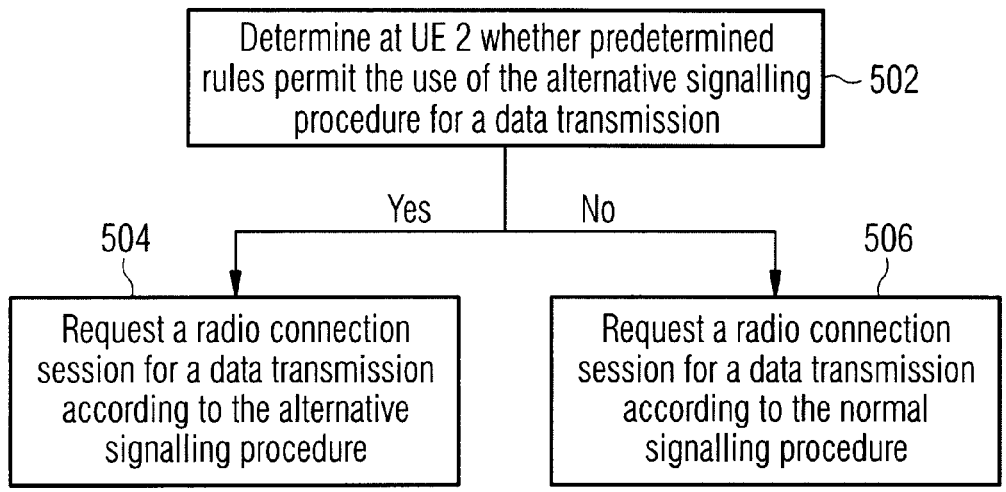
FIG. 5 illustrates a technique according to a first embodiment of the present invention.

According to a first embodiment illustrated in FIG. 5, the UE 2 decides (STEP 502) what data transmissions to identify as small data transmissions (i.e. data transmissions for which to request the alternative type of signalling procedure), taking into account one or more rules outside the control of the UE 2, which are either defined as standard rules and pre-stored in the UE itself or decided by the operator of the network and advertised in transmissions by the network. The rules are aimed at controlling the impact of requests for data transmissions according to the alternative signalling procedure on the overall performance of the network (including e.g. the impact on the control channels used to communicate signalling for data transmissions, and/or the impact on the contention-based random access channel via which connection sessions are initiated for both types of signalling procedure.

The rules according to which UE 2 makes a decision include any one of, or any combination of one or more of, the following.

1. UE shall not request the alternative type of signalling procedure for a data transmission if less than a threshold interval of time has elapsed since the alternative type of signalling procedure was most recently used for a data transmission from the UE. The interval of time between connection sessions using the alternative type of signalling procedure for data transmissions shall be no less than said threshold. The threshold interval may be pre-defined as a standard requirement for any e.g. 3GPP network, or the operator of the network may have freedom to vary the threshold interval. In the case of the latter, the network can communicate the value of the threshold interval to UEs within its service area via dedicated messages (e.g, either NAS layer messages or AS layer messages) or via system information broadcasting.

2. UE shall not request a connection session for a data transmission according to the alternative type of signalling procedure if the UE has more than a threshold amount of data to transmit in the connection session. For example, the UE shall not request the alternative type of signalling procedure if the one or more IP packets that the UE has to transmit in the connection session have a combined size of more than said threshold amount. The threshold amount may be pre-defined as a standard requirement for any e.g. 3GPP network, or the operator of the network may have freedom to vary the threshold amount. In the case of the latter, the network can communicate the value of the threshold amount to UEs within its service area via dedicated messages (e.g, either NAS layer messages or AS layer messages) or via system information broadcasting.

3. UE shall not request the alternative type of signalling procedure for any data transmission relating to any application outside of a predetermined group of selected applications. The predetermined group of selected applications may be pre-defined as a standard requirement for any e.g. 3GPP network, or the operator of the network may have freedom to vary the group of applications for the alternative type of signalling procedure is permitted for data transmissions. In the case of the latter, the network can communicate the identity of the applications within the permitted group to UEs within its service area via dedicated messages (e.g, either NAS layer messages or AS layer messages) or via system information broadcasting.

4. UE shall not request the alternative type of signalling procedure for any data transmission to any application server outside of a predetermined group of selected application servers. The predetermined group of selected application servers may be pre-defined as a standard requirement for any e.g. 3GPP network, or the operator of the network may have freedom to vary the group of application servers for which the alternative type of signalling procedure is permitted for data transmissions. In the case of the latter, the network can communicate the identity of the application servers within the permitted group to UEs within its service area via dedicated messages (e.g, either NAS layer messages or AS layer messages) or via system information broadcasting 5. UE shall not request the alternative type of signalling procedure for any retransmission, i.e. any repeat of an earlier data transmission for which the UE failed to detect positive acknowledgment feedback.

6. UE shall not request the alternative type of signalling procedure unless UE detects an indication from the network that the network operates the alternative type of signalling procedure for data transmissions, and that the alternative type of signalling procedure is currently activated for the cell serving UE.

Where the UE 2 has UDP/IP data packet(s) to transmit, UE 2 initiates the establishment of a radio connection session by transmitting a random access preamble message via a contention-based random access channel (RACH) for the cell serving the UE 2, and looks for a random access response message on a downlink shared channel (DL-SCH) for the same cell. The procedure continues with the UE 2 transmitting a RRC Connection Request message via an uplink shared channel (UL-SCH) for the serving cell. Where the rules indicate that the UE may request the alternative type of signalling procedure for a data transmission, the UE 2 does so (STEP 504) by including a "small data indicator" in the RRC Connection Request message or in the RRC Connection Setup Complete message. The "small data indicator" is recognised by the network as a request for the alternative type of signalling procedure for the data transmission. Where the rules indicate that the UE shall not request the alternative type of signalling procedure for the data transmission, UE 2 requests the normal type of signalling procedure for the data transmission (STEP 506) by omitting the "small data indicator" from the RRC Connection Request message or from the RRC Connection Setup Complete message.

According to a second embodiment, the network decides whether to direct a change to the normal type of signalling procedure after receiving a request from the UE 2 for the alternative type of signalling procedure for a data transmission. The decision by the network may be based on one or more of the following: (a) one or more indicators of the performance of the control and random access channels for the cell serving the UE 2; (b) the amount of data ready to be transmitted from the network to UE 2; and (c) a history of past requests by the UE 2 for the alternative type of signalling procedure for data transmissions (such as the frequency of requests by the UE 2 for the alternative type of signalling procedure for data transmissions). For example, the overall load on the serving cell can be used as an indicator of the performance of the control and radio access channels for the serving cell.

Figure 6:
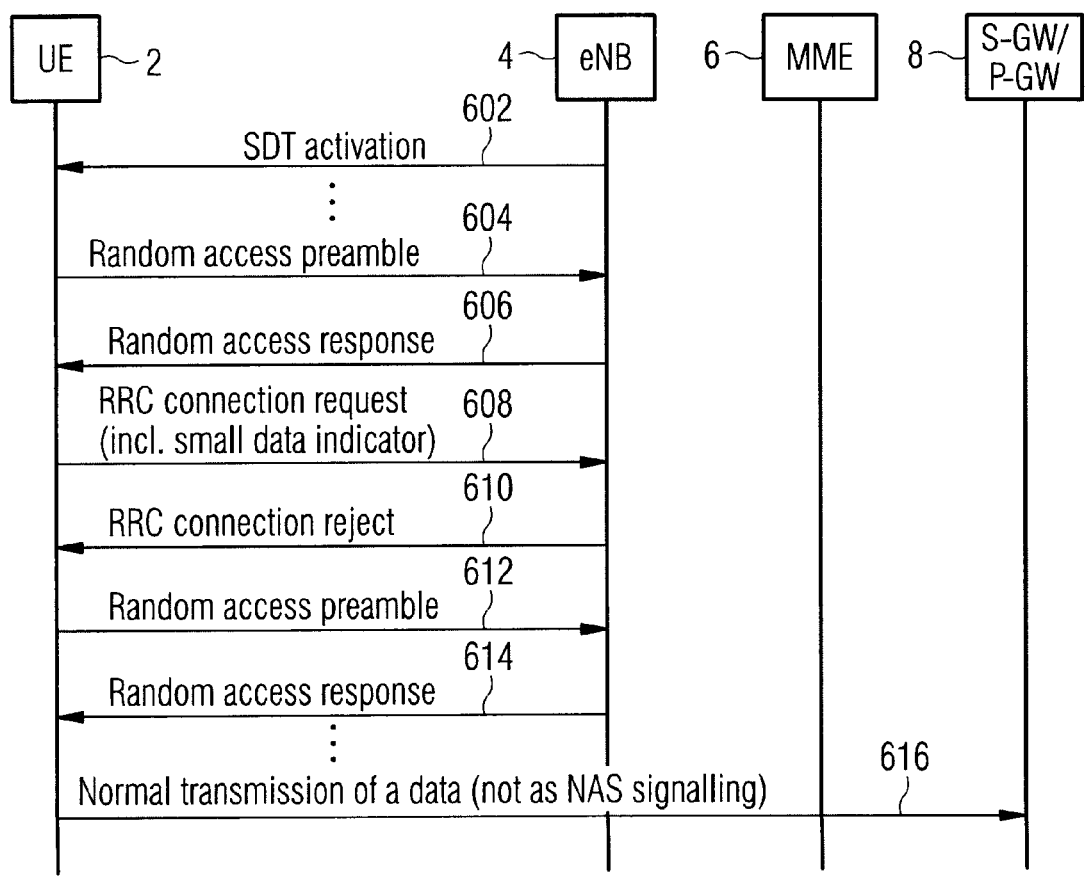
Figure 7:
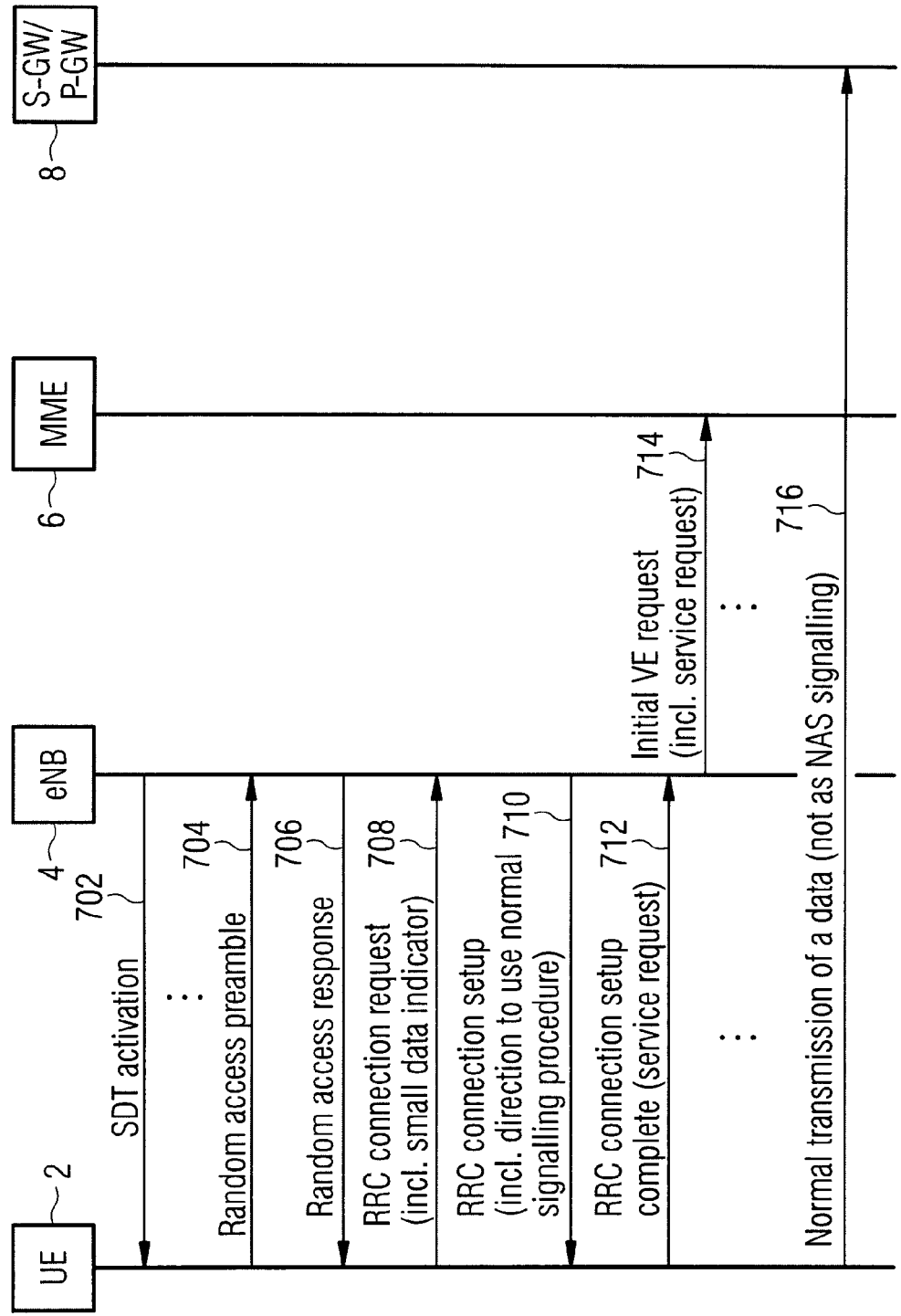

In each of the examples illustrated in FIGS. 6 to 8, a decision is made at UE 2 to request the alternative type of signalling procedure for a data transmission. UE 2 initiates the establishment of a radio connection session by transmitting a Random Access Preamble message on contention-based random access channel (RACH) for the serving cell (STEP 604, 704, 804); and then looks for a Random Access Response message identifying the UE 2 on the downlink shared channel (DL-SCH) for the serving cell (STEP 606, 706, 806). In response to detecting a Random Access Response message identifying the UE 2, UE 2 transmits a RRC Connection Request message on the uplink shared channel (UL-SCH) for the serving cell (STEP 608, 708, 808). The RRC Connection Request message includes: a short temporary NAS identifier (SAE-Temporary Mobile Subscriber Identity (S-TMSI)) previously assigned to the UE 2 by the MME when UE 2 first attached to the network; and a "small data indicator", which is recognised by the network as a request for the alternative type of signalling procedure for a data transmission.

In the example illustrated in FIG. 6, the eNB 4 operating the serving cell decides not to permit the use of the alternative type of signalling procedure for the data transmission, and eNB 4 transmits a message to UE on DL-SCH informing UE of its decision (STEP 610). The message could be a RRC Connection Reject message indicating that the cause for the rejection is that the alternative type of signalling procedure is not permitted for the data transmission, and/or that UE 2 should request the normal type of signalling procedure for the data transmission. The rejection message could also include information about the length of time for which UE is prohibited from making a new request for the alternative type of signalling procedure for a data transmission. The message informing UE 2 of its decision may alternatively be a RRC Connection Release message. In the case of a UMTS network, the message informing UE of its decision may alternatively be a Signalling Connection Release message.

UE 2 may then initiate the establishment of a connection session according to the normal type of signalling procedure for the data transmission, by transmitting a new Random Access Preamble message (STEP 612), and transmitting a RRC Connection Request message (without the "small data indicator") in response to detecting a new Random Access Response message identifying the UE (STEP 614). The transmission of the UDP/IP packets is thereafter made in the normal way (i.e. not as NAS signalling) (STEP 616).

In a second example illustrated in FIG. 7, the eNB 4 operating the serving cell instead continues with the RRC connection procedure by transmitting a RRC Connection Setup message (STEP 710), but includes in the RRC Connection Setup message a direction for UE 2 to proceed with the radio connection session according to the normal type of signalling procedure. The indication could take the form of a predetermined value for a new information element included in the RRC Connection Setup message. UE 2 responds by transmitting a RRC Connection Setup Complete message including a service request (and without including the UDP/IP data packet(s) for which the radio connection session is being established) (STEP 712); and the procedure further continues with the eNB 4 sending an Initial UE message including a service request to the MME 6 (STEP 714). The transmission of the uplink UDP/IP data packet(s) is made in the normal way (i.e. not as NAS signalling) (STEP 716).

According to one variation of the technique illustrated in FIG. 7, the eNB 4 is configured to include in the RRC Connection Setup message a positive indication that the alternative type of signalling procedure is permitted for the data transmission; and UE 2 only proceeds according to the alternative type of signalling procedure for the data transmission if it detects this positive indication in the RRC Connection Setup message. If UE 2 does not detect such a positive indication in the RRC Connection Setup message, UE 2 proceeds with the data transmission according to the normal type of signalling procedure. The positive indication could take the form of an "allowing" bit in the RRC Connection Setup message.

In a third example illustrated in FIG. 8, the eNB 4 initially permits the use of the alternative type of signalling procedure for the uplink data transmission, but the network later decides to continue with the radio connection session according to the normal type of signalling procedure, e.g. in response to an indication that there is downlink data ready for transmission from the network to the UE. In more detail: eNB 4 transmits the RRC Connection Setup message (without any direction to UE 2 to proceed with the session according to the normal type of signalling procedure) (STEP 810); UE 2 transmits a RRC Connection Setup Complete message including the uplink UDP/IP data packets for which the radio connection session was initiated (STEP 812); eNB 4 sends an Initial UE message to MME 6 including said uplink UDP/IP data packets (STEP 814); MME 6 forwards the uplink UDP/IP data packet(s) to the S-GW/P-GW 8 by means of a GPRS Tunneling Protocol (GTP-U) message (STEP 816); S-GW/P-GW then decides that the radio connection session should be continued with according to the normal type of signalling procedure because it has become aware of downlink data ready for transmission to the UE; S-GW/P-GW sends a downlink data notification message to MME 6, including a direction to continue with the radio connection session according to the normal type of signalling procedure (STEP 818) (this direction could take the form of a predetermined value for a new information element for the downlink data notification message from S-GW/P-GW 8 to MME 6); MME 6 sends an Initial Context Setup Request message to eNB including a direction to continue with the radio connection session according to the normal type of signalling procedure (STEP 820), and continues the normal security activation procedure and default bearer set up procedure; eNB 4 transmits a RRC Connection Reconfiguration message to UE 2 including a direction to continue with the session according to the normal type of signalling procedure (STEP 822); and a radio connection session continues with the normal type of signalling procedure for the transmission of the downlink data to the UE 2 (STEP 824).

One advantage of the above-described techniques is that they can be used to control the load on the control and/or random access channels for the serving cell, whilst at the same time continuing to support the use of the alternative type of signalling procedure for some data transmissions.

Each of the embodiments described above may be supplemented by the technique of the network communicating to the UE 2 an indication of whether the network (e.g. eNB, MME and S-GW/P-GW) supports the alternative type of signalling procedure for data transmissions, and if so whether or not the use of the alternative type of signalling procedure for data transmissions is to be temporarily stopped for the serving cell (e.g. because of an indication of an excessive load on the control and/or random access channels for the serving cell). This information may, for example, be communicated in a message from the MME 6 to the UE 2 during an Attach procedure or a Tracking Area Update procedure, in a message from the eNB 4 to the UE 2 in system information or a dedicated RRC message and in a message between eNB 4 and MME 6 during S1 setup or reconfiguration procedure. The example of communicating this information by a eNB-UE message is shown in FIGS. 6, 7 and 8 as STEP 602, 702 and 802, respectively; in which SDT activation refers to activation of the alternative signalling procedure for data transmissions.

UE 2 refrains from making any request for the alternative type of signalling procedure for a data transmission if it happens to detect an indication that the network does not support the alternative type of signalling procedure for data transmissions, or the use of the alternative type of signalling procedure for data transmissions is currently temporarily stopped for the serving cell. On the other hand, a positive indication from the network that the use of the alternative type of signalling procedure for data transmissions is currently activated for the serving cell is a confirmation to UE 2 that it can continue to make requests for data transmissions according to the alternative signalling procedure.

In the case of the first embodiment illustrated in FIG. 5, UE 2 only goes through the rule-based decision process described above if it detects an indication from the network that the network does support the alternative type of signalling procedure for data transmissions, and that the alternative type of signalling procedure for data transmissions is currently activated for the serving cell.

Embodiments of the invention have been described above in the context of an EPS network including a E-UTRAN; but the same kind of techniques are also applicable to other kinds of networks, such as a network including a UMTS radio access network.

The above-described operations may require data processing in the various entities. The data processing may be provided by means of one or more data processors. Similarly various entities described in the above embodiments may be implemented within a single or a plurality of data processing entities and/or data processors.

The embodiments of the invention may be implemented as at least one software application, module or unit configured as arithmetic operation, or as a program (including an added or updated software routine), executed by at least one operation processor. Programs, also called program products or computer programs, including software routines, applets and macros, may be stored in any apparatus-readable non-transitory data storage medium and they include program instructions to perform particular tasks. Computer programs may be coded by a programming language, which may be a high-level programming language, such as objective-C, C, C++, C#, Java, etc., or a low-level programming language, such as a machine language, or an assembler.

For example the embodiments of the invention may be implemented as a chipset, in other words a series of integrated circuits communicating among each other. The chipset may comprise microprocessors arranged to run code, application specific integrated circuits (ASICs), or programmable digital signal processors for performing the operations described above.

Embodiments of the invention may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

In addition to the modifications explicitly mentioned above, it will be evident to a person skilled in the art that various other modifications of the described embodiment may be made within the scope of the invention.

What is claimed is:
1. An apparatus comprising:
 a processor and memory including computer program code, wherein the memory and computer program code are configured to, with the processor, cause the apparatus to:
 determining by a communication device whether an indication from a network has been received indicating whether or not a cell serving the communication device currently supports and activates a first type of signalling procedure for data transmissions from the communication device to the network;
 performing as part of a random access connection procedure:
  decide, responsive to a determination the indication has been received and indicates the cell supports and activates the first type of signalling, at the communication device between the first type of signalling procedure and a second type of signalling procedure for a data transmission to the network, wherein a relative signalling efficiency of the first type of signalling procedure compared to the second type of signalling procedure decreases with increasing amounts of data transmitted in a connection session, based on one or more rules outside the control of the communication device;
  in response to deciding to perform the first type of signalling procedure, sending by the communication device a request to the network to use the first type of signalling procedure to transmit data; and
  in response to an indication from the network the communication device interprets as meaning the first type of signalling procedure can be used, transmitting data, as part of the random access procedure and by the communication device to the network, using the first type of signalling procedure;
 in response to an indication from the network the communication device interprets as meaning the second type of signalling procedure should be used, finishing the random access connection procedure and transmitting data by the communication device to the network using the second type of signalling procedure; and
 in response to an indication from the network the communication device interprets as meaning the first type of signalling procedure is not permitted for the data transmission, finishing the random access connection procedure, performing another random access procedure and transmitting data by the communication device to the network using the second type of signaling procedure.
2. An apparatus according to claim 1, wherein: and said one or more rules include one or more of the following: (a) a rule that the time interval between any consecutive radio connection sessions for data transmission according to said first type of signalling procedure must be more than a threshold value; (b) a rule that the amount of data transmitted in a single connection session according to said first type of signalling procedure must be less than a threshold value; and (c) a rule prohibiting the use of said first type of signalling procedure for data transmissions associated with any application outside a limited selection of applications; (d) a rule prohibiting the use of said first type of signalling procedure for data transmissions to any application server outside of a limited selection of application servers; and (e) a rule excluding the use of said first type of signalling procedure for retransmissions.
3. An apparatus according to claim 1 wherein said one or more rules are defined as standard rules and are pre-stored at the communication device.

4. An apparatus according to claim 1, wherein the memory and computer program code are further configured to, with the processor, cause the apparatus to: receive information about said one or more rules in transmissions by the network.

5. An apparatus according to claim 2, wherein the memory and computer program code are further configured to, with the processor, cause the apparatus to: in response to detecting at said communication device the indication indicates that the cell serving said communication device is currently not supporting data transmissions according to a first type of signalling procedure, performing the following: refraining from making any request for a radio connection session for a data transmission according to said first type of signalling procedure.

6. An apparatus according to claim 5, wherein said indication comprises (a) an absence of a positive indication from the network that the cell serving said communication device is currently supporting data transmissions according to said first type of signalling procedure, or (b) a deactivation indicator in a message from the network.

7. An apparatus comprising:
a processor and memory including computer program code, wherein the memory and computer program code are configured to, with the processor, cause the apparatus to:
transmit from a cell of a network to a communication device an indication whether or not the cell, which serves the communication device, currently supports and activates a first type of signalling procedure for data transmissions from the communication device to the network;
performing as part of a random access connection procedure:
transmit from the network to the communication device information about one or more rules to be followed by said communication device when deciding between the first type of signalling procedure and a second type of signalling procedure for a data transmission from the communication device to the network, wherein a relative signalling efficiency of the first type of signalling procedure compared to the second type of signalling procedure decreases with increasing amounts of data transmitted in a connection session;
receiving by the cell from the communication device a request to the network to use the first type of signalling procedure to transmit data;
transmitting from the cell a response indicating one of the following: the request is accepted, the second type of signalling procedure is to be used by the communication device, or the first type of signalling procedure is not permitted;
in response to transmitting the response indicating the request is accepted, receiving data, as part of the random access connection procedure and by the cell and from the communication device, using the first type of signalling procedure;
in response to transmitting the response indicating the second type of signalling procedure should be used, finishing the random access procedure and receiving data by the cell and from the communication device to the network using the second type of signalling procedure; and
in response to transmitting the response indicating the first type of signalling procedure is not permitted for the data transmission, finishing the random access connection procedure, and performing another random access procedure and receiving data by the cell and from the communication device using the second type of signalling procedure.

8. An apparatus according to claim 7, wherein said transmitting the indication whether or not the cell is currently supporting and activating data transmissions according to the first signalling procedure comprises sending an activation indicator or a deactivation indicator.

9. An apparatus according to claim 7, wherein:
the memory and computer program code are configured to, with the processor, cause the apparatus to:
decide, prior to transmitting from the cell the response, at said cell whether to direct a change to said second type of radio signalling procedure.

10. An apparatus according to claim 9, wherein said deciding is based on at least one of the following: (a) one more indicators of performance of control and/or access channels; (b) an amount of data to be transmitted from the cell to the communication device; and (c) a history of past requests by the communication device for connection sessions for data transmission according to said first signalling procedure.

11. An apparatus according to claim 9, wherein in response to deciding at said network to direct a change to said second type of signalling procedure the transmitting from the cell a response indicating the first type of signalling procedure is not permitted further comprises communicating from the cell to the communication device a rejection of said request to use the first type of signalling procedure together with a direction to request a new radio connection session for a data transmission according to said second type of signalling procedure.

12. An apparatus according to claim 11, wherein communicating said rejection of said request comprises sending a RRC connection reject message, a RRC connection release message or a signalling connection release message.

13. An apparatus according to claim 11, wherein communicating a rejection of said request is done together with communicating information about a length of time for which the communication device is prohibited from making a new request for a connection session for a data transmission according to said first type of signalling procedure.

14. An apparatus according to claim 9, wherein in response to deciding to direct a change to said second type of signalling procedure the transmitting from the cell a response indicating the second type of signalling procedure is to be used by the communication device comprises sending to said communication device a connection set up message including a direction to proceed with a radio connection session according to said second type of signalling procedure.

15. An apparatus according to claim 9, wherein in response to deciding to direct a change to said second type of signalling procedure after receiving the data according to said first signalling procedure, sending one or more messages towards said communication device including a direction to continue with an existing radio connection session according to said second type of signalling procedure.

16. An apparatus according to claim 8, wherein transmitting from a cell of a network to a communication device an indication whether or not the cell currently supports and activates a first type of signalling procedure further comprises communicating from said cell to said communication device the indication that the cell is currently supporting data transmissions according to said first signalling procedure.

17. An apparatus according to claim 16, wherein said indication comprises an activation indicator.

18. A method comprising:
determining by a communication device whether an indication from a network has been received indicating whether or not a cell serving the communication device currently supports and activates a first type of signalling procedure for data transmissions from the communication device to the network;
performing as part of a random access connection procedure:
decide, responsive to a determination the indication has been received and indicates the cell supports and activates the first type of signalling, at the communication device between the first type of signalling procedure and a second type of signalling procedure for a data transmission to the network, wherein a relative signalling efficiency of the first type of signalling procedure compared to the second type of signalling procedure decreases with increasing amounts of data transmitted in a connection session, based on one or more rules outside the control of the communication device;
in response to deciding to perform the first type of signalling procedure, sending by the communication device a request to the network to use the first type of signalling procedure to transmit data; and
in response to an indication from the network the communication device interprets as meaning the first type of signalling procedure can be used, transmitting data, as part of the random access procedure and by the communication device to the network, using the first type of signalling procedure;
in response to an indication from the network the communication device interprets as meaning the second type of signalling procedure should be used, finishing the random access connection procedure and transmitting data by the communication device to the network using the second type of signalling procedure; and
in response to an indication from the network the communication device interprets as meaning the first type of signalling procedure is not permitted for the data transmission, finishing the random access connection procedure, performing another random access procedure and transmitting data by the communication device to the network using the second type of signaling procedure.

19. A computer program product comprising a non-transitory computer-readable medium comprising program instructions, the program instructions configured to cause an apparatus to perform the method of claim 18 in response to the apparatus executing the program instructions.

* * * * *